US006227805B1

(12) United States Patent
Besse et al.

(10) Patent No.: US 6,227,805 B1
(45) Date of Patent: May 8, 2001

(54) COMPOSITE MATERIAL VARIABLE PITCH BLADE FOR HELICOPTER ROTOR AND MANUFACTURING PROCESS OF SUCH A BLADE

(75) Inventors: Jean-Luc Christian Besse, Saint Ouen; Jacques Joseph Gaffiero, Paris, both of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/271,419

(22) Filed: Mar. 16, 1999

(30) Foreign Application Priority Data

Mar. 23, 1998 (FR) .................................................. 98 03542

(51) Int. Cl.[7] ................................ B63H 1/26; F01D 5/14
(52) U.S. Cl. ............................................................ 416/226
(58) Field of Search ................................ 416/226, 229 R, 416/230, 500

(56) References Cited

U.S. PATENT DOCUMENTS

| 2,588,570 | * | 3/1952 | Pitcairn | 416/226 |
| 3,782,856 | * | 1/1974 | Salkind et al. | 416/226 |
| 3,950,115 | * | 4/1976 | Euler | 416/226 |
| 3,967,996 | * | 7/1976 | Kamov et al. | 416/226 X |
| 3,999,888 | * | 12/1976 | Zincone | 416/230 X |
| 4,626,172 | * | 12/1986 | Mouille et al. | 416/226 X |
| 4,696,623 | * | 9/1987 | Bost | 416/230 |
| 4,892,462 | * | 1/1990 | Barbier et al. | 416/226 |
| 5,273,398 | * | 12/1993 | Reinfelder et al. | 416/500 X |
| 5,378,109 | | 1/1995 | Lallo et al. | 416/226 |
| 6,056,838 | * | 5/2000 | Besse et al. | 416/230 X |

FOREIGN PATENT DOCUMENTS

| 2 016 849 | 5/1970 | (FR) . |
| 2 740 379 | 4/1997 | (FR) . |

OTHER PUBLICATIONS

McCarthy R F J Et Al: "Polymer composite applications to aerospace equipment" Composites manufacturing, vol.5, No. 2, Jun. 1, 1994, pp. 83–93,XP000450078 * p. 84, col. 1, paragraph 3—p. 87, col. 1, paragraph 2 ; figures 5, 8–10 ; board 1 *.

* cited by examiner

Primary Examiner—John E. Ryznic
(74) Attorney, Agent, or Firm—Piper Marbury Rudnick & Wolfe (57) ABSTRACT

It concerns the making of a composite material blade according to the RTM process in which the casing cover, the spars and the anchoring reinforcements of the blade are respectively constituted from at least one fabric cut-out which includes at least two folds of intersecting carbon fiber fabric, the folds being superposed on each other forming a pre-specified angle between them.

16 Claims, 6 Drawing Sheets

COMPOSITE MATERIAL VARIABLE PITCH BLADE FOR HELICOPTER ROTOR AND MANUFACTURING PROCESS OF SUCH A BLADE

FIELD OF INVENTION

The present invention relates to a composite material blade. The invention is particularly applicable, but not exclusively, to variable pitch blades intended to be fitted to helicopter rear rotors.

BACKGROUND OF THE INVENTION

A composite material blade including a part forming the blade foot for the connection to driving means and an aerodynamically profiled main blade section is known, particularly from U.S. Pat. No. 6,035,531, which is incorporated by reference herein, said main blade section comprising at least one casing cover and two spars extending along the span of the blade and each located against the casing cover, one against the intrados side and the other against the extrados side of the blade, the spars extending into the part forming the blade foot, the part forming the blade foot including anchoring reinforcements located on either side of each spar.

The blade of the above mentioned type is obtained by the molding process commonly called Resin Transfer Molding or RTM.

Even if this molding technique enables the making, at moderate cost, of a blade having an excellent surface state coming out of the mold, so that very little touching up is necessary before this blade is painted, it is still necessary to improve its mechanical behavior, particularly in the spar, and to reduce the number of cut-outs in the covering and in the blade attachment zone.

SUMMARY OF THE INVENTION

To this end, according to the invention, a composite material blade of the above mentioned type, is mainly characterized in that the casing cover, the spars and the anchoring reinforcements are respectively constituted from at least one fabric cut-out which includes at least two folds of intersecting carbon fibers fabric, the folds being superposed on each other forming a pre-specified angle between them.

The invention thus enables, in controlling the folds in bundles, to reduce the number of carbon fabric templates entering into the manufacture of the blade and to reduce the blade manufacturing cost.

The blade according to the invention can possibly comprise in addition one or several of the following characteristics:

- the casing cover, the spars and the anchoring reinforcements are each constituted from a stack of cut-outs of a first and/or second type;
- the first type of cut-out includes two folds forming an angle equal to either 0° or 90° between them;
- the second type of cut-out includes four folds forming successive angles equal, in absolute value, to 45°, 0° and 45° between them the folds are evenly distributed fabric folds;
- the spars are constituted from a stack of two cut-outs of the first type, each cut-out forming an angle equal to 0° with the axis of the blade span;
- the spars extend approximately to the blade leading edge
- the transverse section of the spars varies along the blade span
- the casing cover includes a cut-out of the first type oriented at 45° relative to the axis of the blade span;
- the anchoring reinforcements comprise a stack of four cut-outs of the second type forming angles of 45° between them;
- the four cut-outs are of different length and set back relative to each other so that the thickness of the stack, at the ends of the cut-outs, is approximately continuously variable;
- the main blade section of the preform comprises a central light material filling body;
- the blade includes, in the part forming the blade foot, at least one incident cylindrical guide portion which comprises a light material filling body on which are draped transverse cut-out stacks, which include, on the blade end side, two cut-outs of the first type oriented at 0° and a cut-out of the first type oriented at 45°, and on the end of the cylindrical portion as well as on the blade foot side, a cut-out of the second type oriented at 45°, one connecting cut-out of the first type being stacked on the previous cut-out, extending in the direction of the blade foot;
- the resin proportion is different from one transverse section to another transverse section of the blade; and
- the incident guide portion comprises adjustment means for the static moment of the blade which include two crimped nuts on at least one face of said portion which is turned towards the blade foot, balancing plates being fixed, by screws, on nuts.

The object of the present invention is also a manufacturing process for the blade as defined above and including stages consisting in making a preform of the blade including a part forming the blade foot for connecting it to driving means and an aerodynamically profiled main blade section, said main blade section comprising at least one casing cover and two spars extending along the span of the blade and each located against the casing cover, one against the intrados side and the other against the extrados side of the blade, the spars extend into the part forming the blade foot, the part forming the blade foot including anchoring reinforcements located either side of each spar;

placing the preform in a mold;

injecting a liquid resin into the mold; and heating the mold to make the resin take; characterized in that the making of the preform includes stages consisting in making an extrados half-shell and an intrados half-shell each including a spar, a casing cover and anchoring reinforcements which undergo a hot compacting stage in order to draw the anchoring reinforcements to an approximately continuously variable thickness.

BRIEF DESCRIPTION OF THE DRAWINGS

An embodiment example of the invention will now be described in relation to the appended drawings, in which.

DETAILED DESCRIPTION OF THE PREFERRED EMBODIMENT

Figure 1:
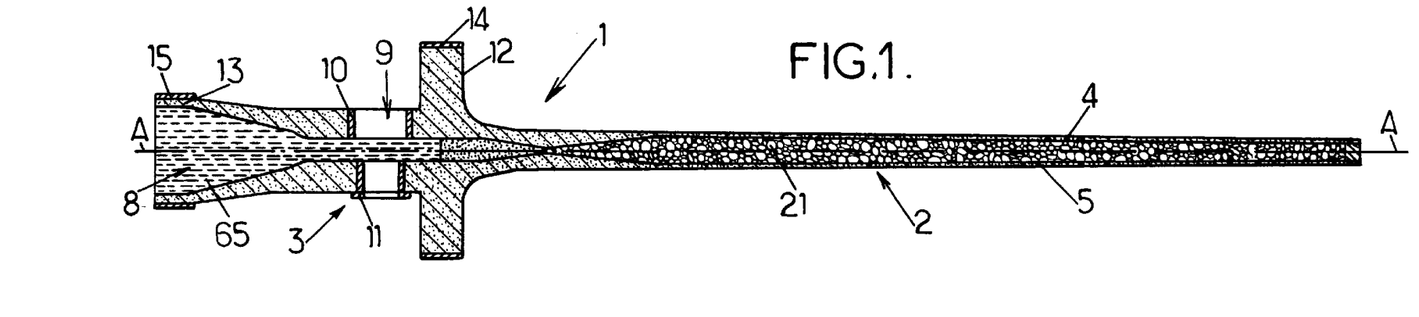
FIG. 1 is a longitudinal sectional view of the blade made according to the process of the present invention
Figure 2:
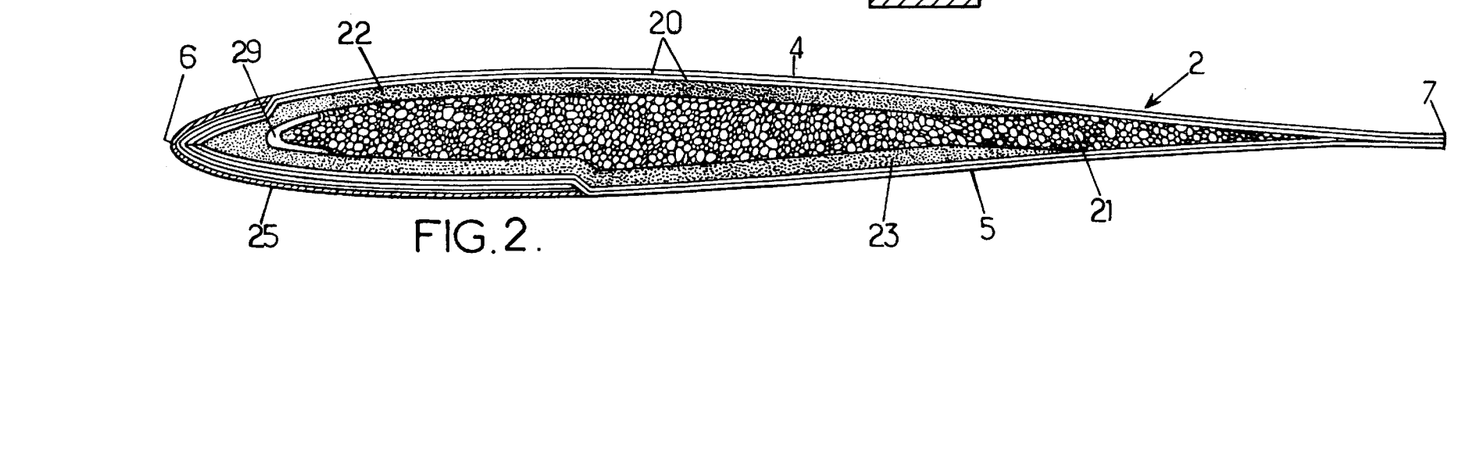
FIG. 2 is a transverse sectional view of the main blade section of the blade along the line II—II of FIG. 1.
Figure 3:
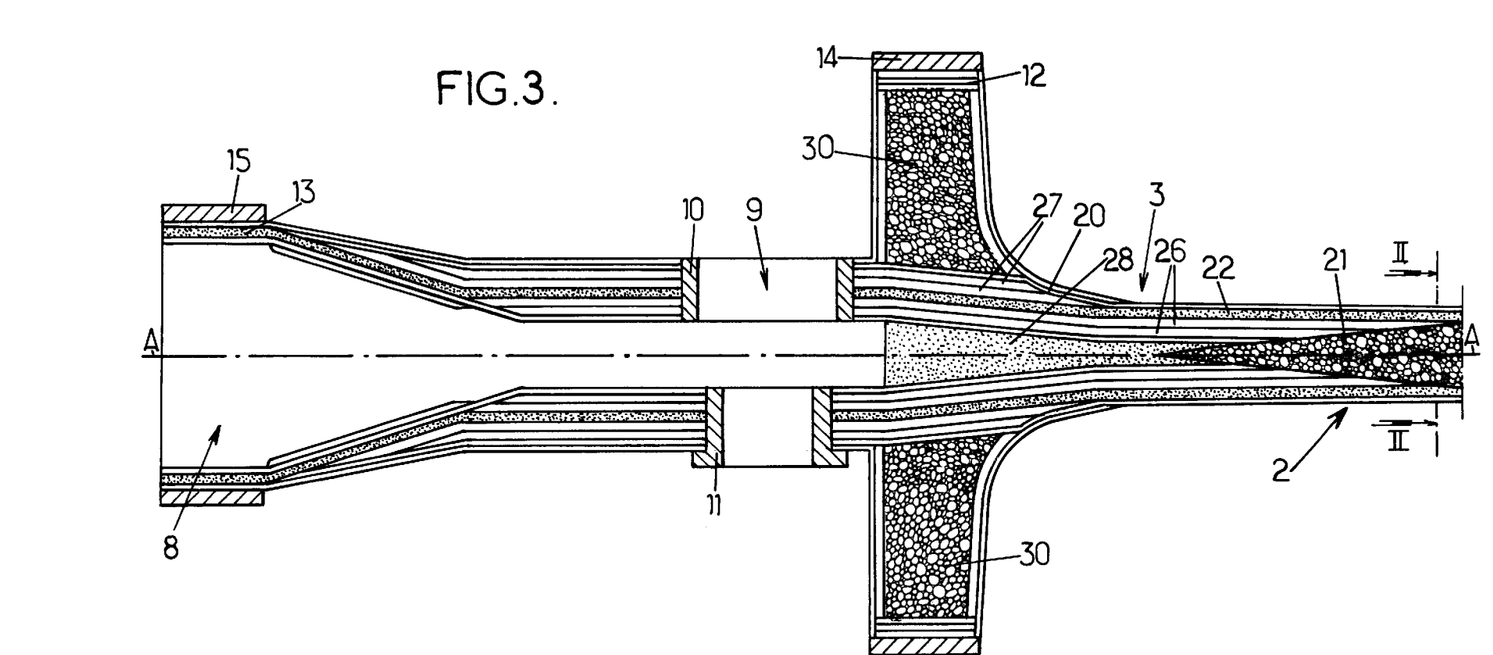
FIG. 3 is a longitudinal section view of the part forming the blade foot of the blade of FIG. 1 showing in detail the arrangement of the blade fabric cut-outs.

The helicopter rear rotor blade 1 made according to the present invention and shown in FIGS. 1 to 3 is composed of a main blade section 2 and a part forming the blade foot 3.

The main blade section 2 is aerodynamically profiled and has an extrados side 4 and an intrados side 5, which are connected together along a leading edge 6 and a trailing edge 7. This profile is generally twisted (not shown in the figures) around a span axis A—A of the blade.

The part forming the blade foot 3 has the general shape of a sleeve open at its end opposite to the main blade section 2 to receive a connecting bar to the helicopter rotor hub (not shown).

This sleeve has an internal cavity 8, which extends along the blade span axis A—A. The sleeve is in addition passed through by a cylindrical opening 9 transverse to the span axis A—A and located at the bottom of said cavity 8. Two metal bushes 10 and 11 are placed inside the cylindrical opening 9.

The part forming the blade foot 2 has in addition two cylindrical portions 12 and 13 which are centered on the span axis A—A and which are each fitted with a peripheral metal bush 14 and 15 in order to be installed in corresponding bearings integral with the hub. The shape of the blade foot 2 is designed in this way because, in this example, the blade is a variable pitch blade, which has in addition a pitch control lever.

As shown in FIG. 2, the main blade section 2 of the blade 1 includes a casing cover 20, a central filling body 21, an extrados spar 22 and an intrados spar 23.

The extrados spar 22 is located between the casing cover 20 and the filling body 21, on the extrados side 4 of the blade whereas the intrados spar 23 is located between the casing cover 20 and the filling body 21, on the intrados side 5 of the blade. The two extrados 22 and intrados 23 spars extend to the neighborhood of the leading edge 6 and extend approximately over all the length of the main blade section 2. The width of these spars decreases from the blade foot 3 to the free end of the blade where the width is approximately equal to half that of this blade. A bracket 29 contributes to the fixing of the two spars 22 and 23 by extending rearwards from the leading edge 6. This bracket reinforces furthermore the resistance of the blade to impacts occurring at the leading edge.

The filling body 21 is for example made in a light material whereas the extrados 22 and intrados 23 spars as well as the casing cover 20 are constituted from carbon fiber fabric cut-outs which are described below.

FIG. 2 also shows that the main blade section 2 comprises a protection shield 25 for the leading edge 6 which has, for example, a width greater on the intrados side than on the extrados side. This shield can be made of titanium or stainless steel sheet, drawn by plastic deformation and shaped between a punch and a die. It can have an expandable thickness in order to improve further the resistance to impact.

FIG. 3 shows the structure of the composite material in the part forming the blade foot 3. The extrados 22 and intrados 23 spars as well as the casing cover 20 extend to the free end of the part forming the blade foot 3. The spars 22 and 23 are thus passed through by the opening 9 so that they take up the centrifugal forces which are exerted in the blade, in order to transmit them to the bar connecting to the hub.

Anchoring reinforcements 26 and 27 are located against the extrados 22 and intrados 23 spars in the part forming the blade foot 3. Some of these reinforcements 26 are located between said spars and the cavity 8. Other reinforcements 27 are provided between said spar and the casing cover 20. These anchoring reinforcements 26 and 27 are also passed through by the opening 9.

Between the bottom of the cavity 8 and the main blade section 2 extend filling fabrics 28 and which are stacked between the anchoring reinforcements 26. Preferably, the filling fabrics 28 form a stack of decreasing thickness in the direction of the main blade section 2.

The anchoring reinforcements 26 and 27 extend into the main blade section 2, having a decreasing thickness to ensure a homogeneous transmission of the forces.

The cylindrical portion 12 of largest diameter is constituted by carbon fiber fabric stacks which will be described below and which are draped around two filling bodies 30 of generally semi-cylindrical shape. The filling bodies 30 are made in a light material, which can be identical to that of the filling body 21 of the main blade section 2.

In order to make the blade described above, two types of fabric cut-out are used.

Figure 4:
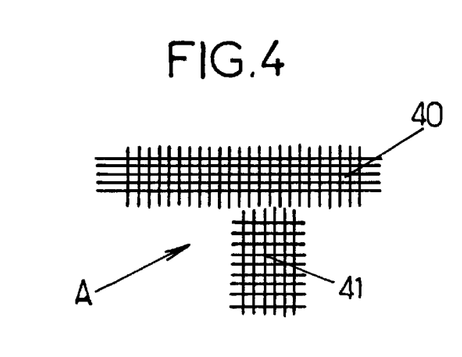
FIGS. 4 and 5 are diagrammatic views of the two types of fold cut-outs used to manufacture the blade according to the invention
Figure 5:
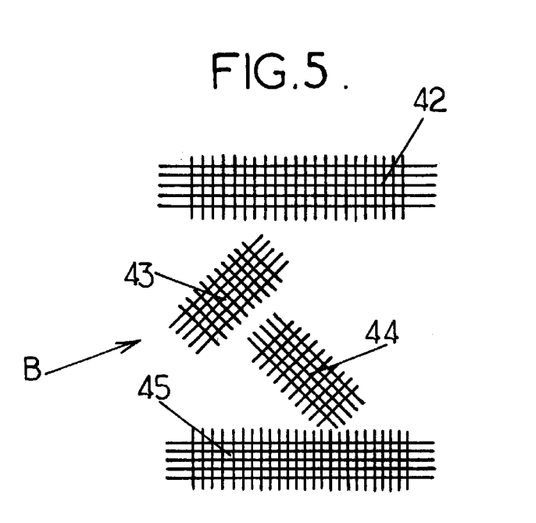

As is shown more particularly in FIGS. 4 and 5, a first type of cut-out, called below type A, is constituted by assembling two folds of intersecting carbon fiber fabric 40 and 41, these folds forming an angle equal to 0° or to 90° between them. A second type of fabric, called below type B, consists of four folds 42 at 45° forming successively angles of more or less 45°, 0° and of more or less 45° between them.

Preferably, the folds used 40 to 45 are regular fabric folds, i.e. there are as any weft fibers as warp fibers. Furthermore, the fabric used is a powdered fabric, i.e. it is constituted from carbon fibers in which a certain quantity of resin is dispersed in the form of powder.

Thus, in the blade manufacturing process which will be described below, only one carbon fabric template and variable cut-out shapes are used, these cut-outs being only of the two types A and B for practically all the component parts of the blade. The manufacturing process described below corresponds approximately to that described in U.S. Pat. No. 6,035,531, inserted as a reference example and in which the cut-outs of the two previously mentioned types are used.

Figure 6:
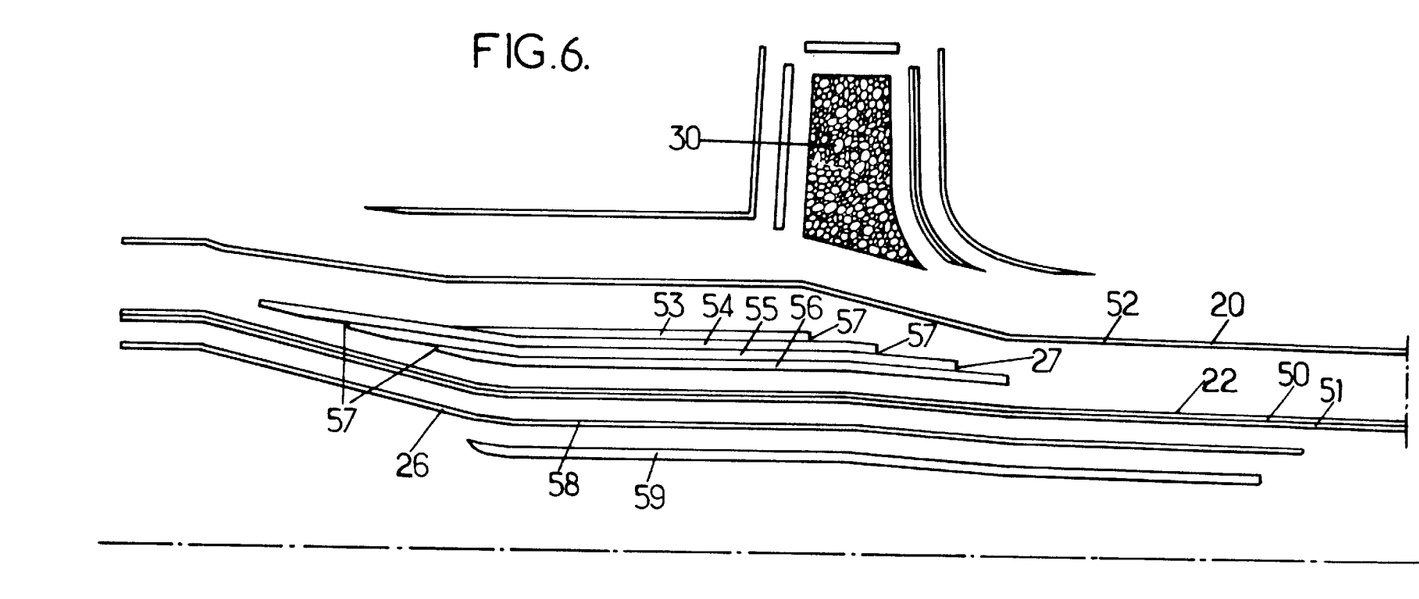
FIGS. 6 and 7 are exploded views of the part forming the blade foot during manufacture.
Figure 7:
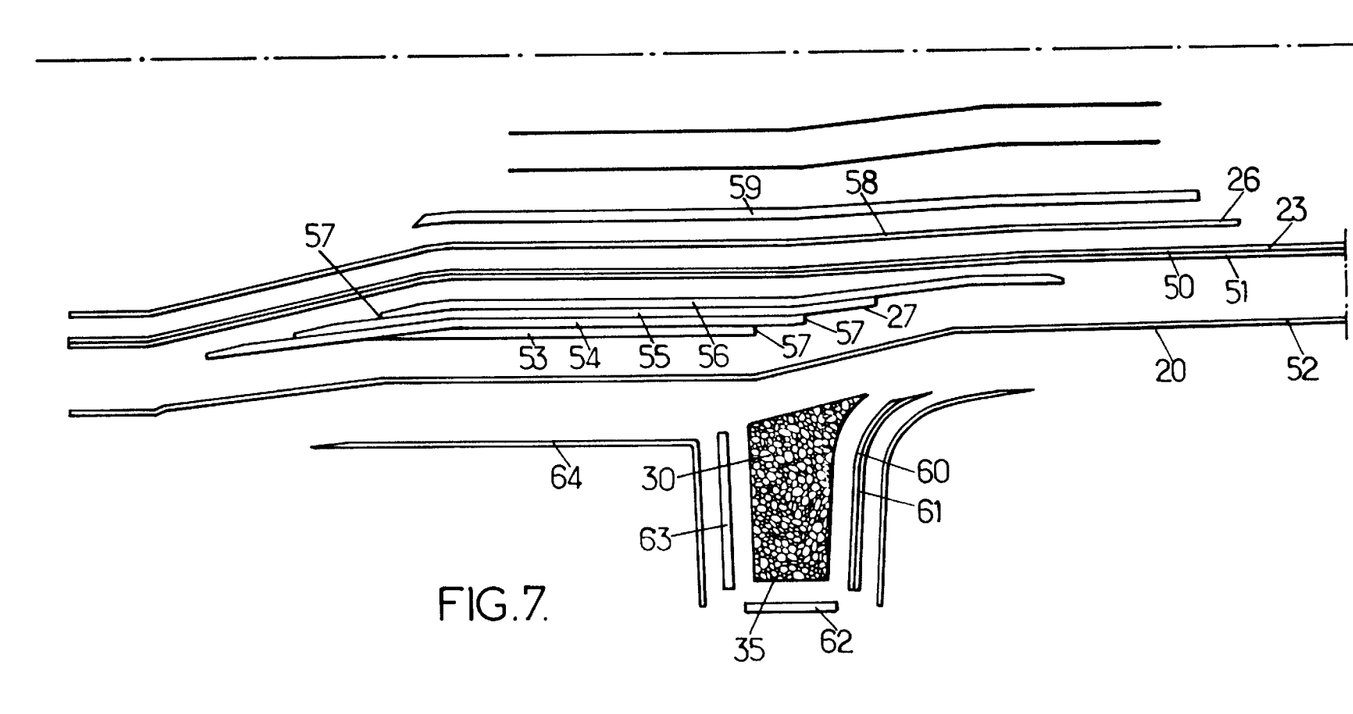

A first stage consists in making an intrados half-shell and an extrados half-shell. Each of these half-shells includes, as is shown in FIGS. 6 and 7, the spar 22, 23, the anchoring reinforcements 26, 27 located against this spar, and the corresponding portion of the casing cover 20.

The spars 22 and 23 are constituted from a stack of two cut-outs 50, 51 of type A which each form an angle equal to 0° with the span axis A—A of the blade 1. The bracket 29 includes a stack of cut-outs of type A oriented at 0°.

The casing cover includes a single cut-out 52 of type A oriented at 45° relative to the axis A—A whereas the anchoring reinforcements 27 include a stack of four cut-outs 53 to 56 of type B which form successively, with the axis A—A, angles of 45°, 0°, 45° and 0°. The four cut-outs 53 to 56 are of different length and are displaced relative to each other so as to constitute a stack of variable thickness. The ends of these cut-outs form indentations 57 between them. The anchoring reinforcements 26 include a cut-out 58 of type A oriented at 0° and a cut-out 59 of type B oriented at 45°.

Furthermore, the incident cylindrical guide portion 12 includes, on the side of the main blade section 2 of the blade, two cut-outs 60, 61 of type A oriented at 0° which are covered by a third cut-out of type A oriented at 45° whereas the bearing surface 35 of this cylindrical part as well as the side 36 of this cylindrical portion located opposite the blade foot 2 are covered by a cut-out 62, 63 of type B oriented at 45°. A connecting cut-out 64 of type A is superposed on the previous cut-out 63, being oriented at 0° and extending in the direction of the blade foot 3.

Figure 8:
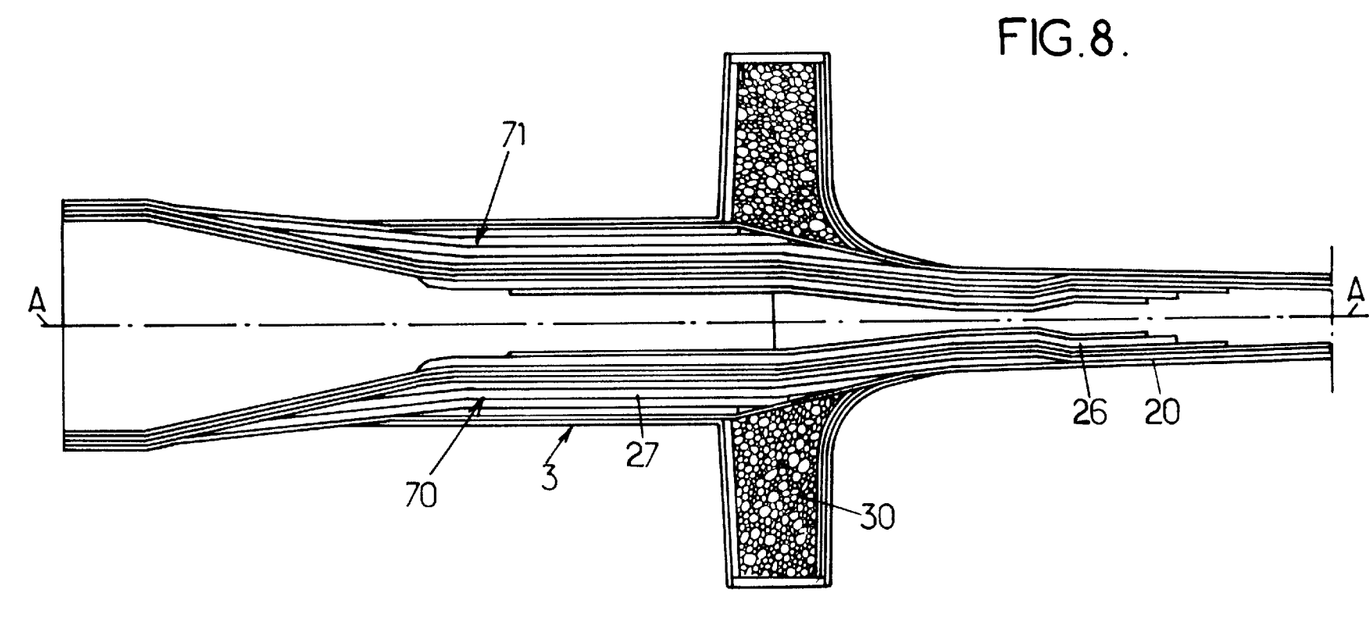
FIG. 8 is a transverse section view of the part forming the blade foot before injection of the thermosetting resin.

The fabric cut-outs 50 to 56 and 58 to 64 are draped in two halves of a shaping mold in order to integrate the blade shapes. The mold halves are then placed around a mandrel in order to exert a pressure, simultaneously with a rise in temperature, on the cut-outs. The pressure enables the size of the indentations 57 to be minimized in order to obtain an approximately continuous variation of the thickness of the anchoring reinforcements 27. In this way two half-shells 70 and 71 are obtained as shown in FIG. 8.

The intrados and extrados half-shells obtained in this way then undergo, as described in U.S. Pat. No. 6,035,531, drilling of the opening 9, then are transported to a final shaping mold which can be the same as the shaping mold. Then the same components as in the previously mentioned document are installed. In addition inside the internal cavity 8 and along the joint plane separating the two half-shells are placed a stack 65 of cut-outs of type A oriented at 0° (FIG. 1) which are U shaped the base of which is narrow in relation to the sides. Furthermore, glass fiber fabrics are placed opposite the metal bushes in order to ensure electrical insulation of the blade.

The process then consists in injecting the thermosetting resin into the preform thus made. As a variant another type of resin can be used, for example a thermoplastic resin. Thus a resin ratio is obtained which is variable from one point to another of the blade since the indentations 57 are more or less compacted in order to obtain the final blade shape, which corresponds to a variable carbon fiber density.

Figure 9:
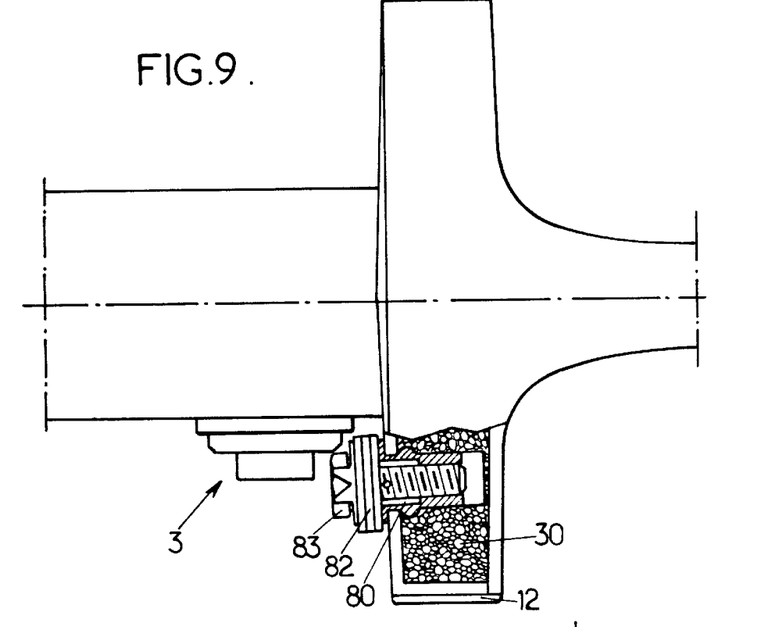
FIGS. 9 and 10 are views of the sides of a portion of the part forming the blade foot carrying blade balancing means.
Figure 10:
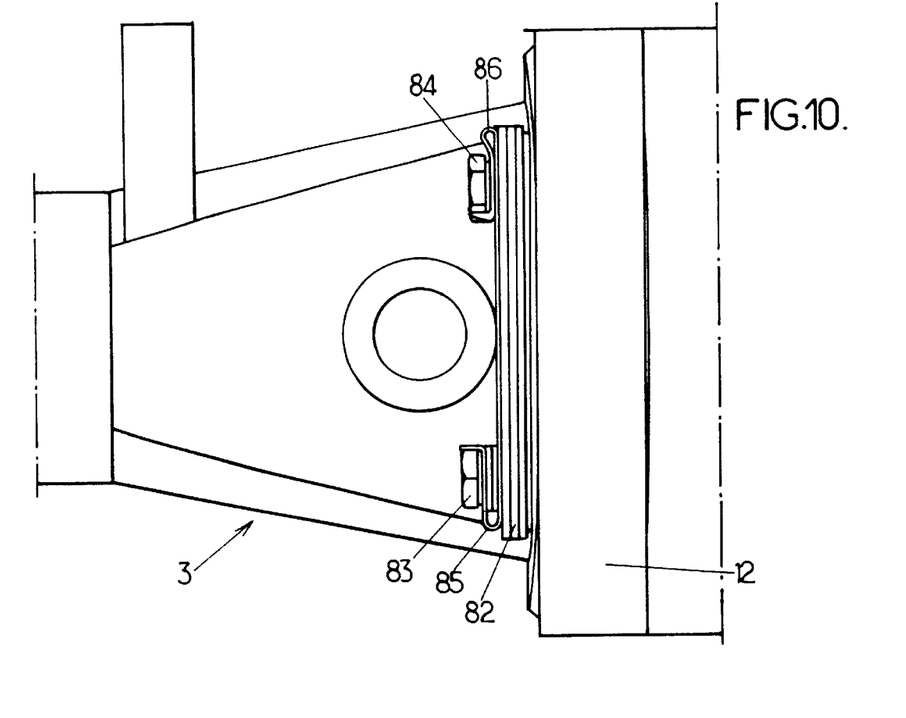

The manufactured blade 1 is an almost finished blade. Only some operations are still necessary such as for example the adjustment of the blade static moment. Thus, the incident guide portion 12 has, on the side located opposite the end of the blade foot 3, two crimped nuts 80 on which balancing plates 82 (FIGS. 9 and 10) are intended to be immobilized by using two hexagonal head screws 83 and 84. These screws are secured as the aeronautical safety standards require, for example by means of a lock-plate 85.

We claim:

1. A composite material blade, comprising: a part forming the blade foot for the connection to driving means and an aerodynamically profiled blade main section, said main blade section having at least one casing cover and two spars extending along the blade span and each located against the casing cover, one against the intrados side and the other against the extrados side of the blade, the spars extending into the part forming the blade foot, the part forming the blade foot including anchoring reinforcements located on either side of each spar, wherein the casing cover, the spars and the anchoring reinforcements are respectively constituted from at least one fabric cut-out which includes at least two folds of intersecting carbon fiber fabric, the folds being superposed on each other forming a pre-specified angle between them, the casing cover, the spars and the anchoring reinforcements are each constituted from a stack of cut-outs of a first and/or a second type, the second type of cut-out includes four folds forming successive angles, equal in absolute value, to 45°, 0° and 45° between them, the blade includes, in the part forming the blade foot at least one incident cylindrical guide portion which comprises a filling body of light material on which are draped transverse stacks of cut-outs, which include, on the side of the blade end, two cut-outs of the first type oriented at 0° and a cut-out of the first type oriented at 45°, and on the end of the cylindrical portion as well as on the side of the blade foot, a cut-out of the second type oriented at 45°, a connecting cut-out of the first type being stacked on the previous cut-out, extending in the direction of the blade foot, the incident guide portion comprises adjustment means for the static moment of the blade which include two crimped nuts on at least one face of said portion which is turned towards the blade foot, balancing plates being fixed, by screws, on the nuts.

2. A blade according to claim 1, wherein the first type of cut-out includes two folds forming an angle equal to either 0° or 90° between them.

3. A blade according to claim 2, wherein the spars are constituted from a stack of two cut-outs of the first type, each cut-out forming an angle equal to 0° with the span axis of the blade.

4. A blade according to claim 2, wherein the spars extend approximately to the leading edge of the blade.

5. A blade according to claim 2, wherein the transverse section of the spars varies along the span of the blade.

6. A blade according to claim 2, wherein the casing cover includes a cut-out of the first type oriented at 45° relative to the span axis of the blade.

7. A blade according to claim 1, wherein the folds are regular fabric folds.

8. A blade according to claim 1, wherein the anchoring reinforcements comprise a stack of four cut-outs of the second type forming angles of 45° between them.

9. A blade according to claim 8, wherein the four cut-outs are of different length and are displaced relative to each other so that, near the ends of the cut-outs, the thickness of the stack is approximately continuously variable.

10. A blade according to claim 8, wherein the resin ratio is different from one transverse section to another transverse section of the blade.

11. A manufacturing process of a blade according to claim 8, including stages consisting in:

making a preform of the blade including a part forming the blade foot for the connection to driving means and an aerodynamically profiled main blade section, said main blade section comprising at least one casing cover and two spars extending along the span of the blade and each located against the casing cover, one against the intrados side and the other against the extrados side of the blade, the spars extending into the part forming the blade foot, the part forming the blade foot including anchoring reinforcements located either side of each spar;

placing the preform in a mold;

injecting a liquid resin into the mold;

and heating the mold to make the resin take;

wherein the making of the preform includes stages consisting in making an extrados half-shell and an intrados half-shell each including a spar, a casing cover and anchoring reinforcements which are subjected to a hot compacting stage in order to draw the anchoring reinforcements to an approximately continuously variable thickness.

12. A blade according to claim 1, wherein the main blade section of the preform comprises a central filling body of light material.

13. A composite material blade, comprising: a part forming the blade foot for the connection to driving means and an aerodynamically profiled blade main section, said main blade section having at least one casing cover and two spars extending along the blade span and each located against the casing cover, one against the intrados side and the other against the extrados side of the blade, the spars extending into the part forming the blade foot, the part forming the blade foot including anchoring reinforcements located on either side of each spar, wherein the casing cover, the spars and the anchoring reinforcements are respectively constituted from at least one fabric cut-out which includes at least two folds of intersecting carbon fiber fabric, the folds being superposed on each other forming a pre-specified angle between them, the casing cover, the spars and the anchoring reinforcements are each constituted from a stack of cut-outs of a first and/or a second type, the first type of cut-out includes two folds forming an angle equal to either 0° or 90°, between them, the second type of cut-out includes four folds forming successive angles, equal in absolute value, to 45°, 0° and 45° between them, the blade includes, in the part forming the blade foot at least one incident cylindrical guide portion which comprises a filling body of light material on which are draped transverse stacks of cut-outs, which include, on the side of the blade end, two cut-outs of the first type oriented at 0° and a cut-out of the first type oriented at 45°, and on the end of the cylindrical portion as well as on the side of the blade foot, a cut-out of the second type oriented at 45°, a connecting cut-out of the first type being stacked on the previous cut-out, extending in the direction of the blade foot.

14. A blade according to claim 13, wherein the spars are constituted from a stack of two cut-outs of the first type, each cut-out forming an angle equal to 0° with the span axis of the blade.

15. A blade according to claim 13, wherein the casing cover includes a cut-out of the first type oriented at 45° relative to the span axis of the blade.

16. A blade according to claim 13, wherein the anchoring reinforcements comprise a stack of four cut-outs of the second type forming angles of 45° between them.

* * * * *